United States Patent
Hirashima et al.

(10) Patent No.: US 6,174,955 B1
(45) Date of Patent: Jan. 16, 2001

(54) WATER-BASED FLUORINE-CONTAINING PAINT

(75) Inventors: Yoshi Hirashima, Nerima; Kazuhiko Maeda, Hino; Satoru Kobayashi, Miyoshi; Kentaro Tsutsumi, Kawagoe, all of (JP)

(73) Assignee: Central Glass Company, Limited, Ube (JP)

( * ) Notice: Under 35 U.S.C. 154(b), the term of this patent shall be extended for 0 days.

(21) Appl. No.: 09/139,272

(22) Filed: Aug. 25, 1998

Related U.S. Application Data

(62) Division of application No. 08/647,853, filed on May 15, 1996, now Pat. No. 5,856,394.

(30) Foreign Application Priority Data

May 15, 1995 (JP) .................................................. 7-115987
May 29, 1995 (JP) .................................................. 7-130310

(51) Int. Cl.⁷ ........................................................ C08L 27/12
(52) U.S. Cl. .................................................................. 524/545
(58) Field of Search .............................................. 524/545

(56) References Cited

U.S. PATENT DOCUMENTS

| | | | |
|---|---|---|---|
| 4,631,326 | 12/1986 | Koishi et al. | 526/249 |
| 5,880,234 * | 3/1999 | Maeda et al. | 526/244 |

FOREIGN PATENT DOCUMENTS

| | | |
|---|---|---|
| 0 508 229 A2 | 10/1992 | (EP) . |
| 57-3850 | 1/1982 | (JP) . |
| 57-34107 | 2/1982 | (JP) . |
| 4-81447 | 3/1992 | (JP) . |

OTHER PUBLICATIONS

Patent Abstracts of Japan, vol. 017, No. 594, JP 05 179176, Taniguchi Eiji, Jul. 20, 1993.
Patent Abstracts of Japan, vol. 013, No. 293, JP 01 087670, Dobashi Masaaki, Mar. 31, 1989.

* cited by examiner

*Primary Examiner*—Kriellion A. Sanders
(74) *Attorney, Agent, or Firm*—Evenson, McKeown, Edwards & Lenahan, P.L.L.C.

(57) ABSTRACT

The invention provides a first water-based fluorine-containing paint including a water-based emulsion containing a fluorine-containing copolymer dispersed therein, and 1–50 parts by weight of a hardener per 100 parts by weight of the copolymer. The copolymer is prepared by copolymerizing 30–65 mol % of a fluoroolefin, 14–69 mol % of a copolymerizable vinyl-containing compound, and 1–30 mol % of a hydroxyl-containing compound and/or a polymerizable carboxyl-containing compound. The hardener is prepared by mixing 1 part by weight of a self-emulsifiable polyisocyanate with 0.01–1 part by weight of a compound containing in the molecule an oxyethylene unit and an alkoxysilyl group. When mixed with the emulsion, the hardener becomes well dispersed therein. The invention further provides a second water-based fluorine-containing paint including a water-based emulsion containing a fluorine-containing copolymer dispersed therein, and a hardener which is a compound containing in the molecule at least two hydrazino groups. The fluorine-containing copolymer is prepared by emulsion polymerization of 30–65 mol % of a fluoroolefin, 0.1–20 mol % of a polymerizable unsaturated carboxylic acid, 1–30 mol % of a polymerizable acetoacetylallyl compound, and 20–65 mol % of one of a vinyl ester and a vinyl ether. The second paint does not cure at ambient temperature, even after the hardener has been added thereto, and thus is usable as a one-package paint.

15 Claims, No Drawings

WATER-BASED FLUORINE-CONTAINING PAINT

This application is a division of application Ser. No. 08/647,853, filed May 15, 1996 now U.S. Pat. No. 5,856,394.

BACKGROUND OF THE INVENTION

The present invention relates to a water-based fluorine-containing paint which is curable at ambient temperature.

Fluororesins are generally excellent in chemical resistance, weather resistance and heat resistance, and in view of these favorable properties the use of fluororesin based paints is increasing in various fields.

As a fluororesin suitable for solvent-thinned paints, U.S. Pat. No. 4,631,326 discloses a fluorine-containing copolymer comprising chlorotrifluoroethylene, a vinyl or isopropenyl ester of fatty acid and a hydroxyl-containing allyl ether. This allyl ether provides a functional group to the copolymer for curing the copolymer. Japanese Patent Unexamined Publication No. 57-34107 discloses a fluorine-containing copolymer which is curable at ambient temperature and comprises a fluoroolefin, cyclohexylvinyl ether, an alkylvinyl ether, and an hydroxyalkylvinyl ether. This hydroxylalkylvinyl ether provides a functional group to the copolymer for curing the copolymer.

Fluororesin-containing solvent-thinned paints are widely used as weather resistant paints in the fields of architecture, automobile and chemical engineering. Furthermore, in view of the environmental protection, fluororesin-containing water-based paints, powder paints, and high-solid paints have been developed, too. Each fluororesin for these paints comprises a fluorocarbon as a main component, such as chlorotrifluoroethylene, tetrafluoroethylene or vinylidene fluoride, and a copolymerizing hydrocarbon monomer such as vinyl ester or vinyl ether, which is added for the purpose of increasing solubility of the fluororesin. it has been difficult to provide the above-mentioned fluororesin-containing water-based paitt with a functional group for forming a cross-linking structure Therefore, a so-called lacquer-type water-based paint in the form of emulsion of a high-molecular compound prepared by emulsion polymerization was used in many cases of the coating step. In view of this, a hardener for forming a cross-linking structure at ambient temperature was developed, such as an oxazoline compound or a self-emulsifiable polyisocyanate. The hardening action by the polyisocyanate, however, tends to terminate due to the reaction of isocyanate group with water (dispersion medium). Thus, it has been necessary to add the polyisocyanate to vehicle, immediately before the coating step, in view of pot life of the paint. However, a conventional self-emulsifiable polyisocyanate is insufficient in dispersibility in water. Thus, it has been difficult, particularly in a coating site, to t uniformly finely disperse the polyisocyanate in water. With this, a coated film becomes insufficient in water resistance, weather resistance, stain resistance and the like.

In contrast to the above-mentioned two-package type paints, there have been proposed one-package type paints in the field of water-based acrylic-ester paints. For example, Japanese Patent Unexamined Publication No. 57-3850 discloses a water-based disperse system containing, as a disperse phase, carbonyl-containing copolymer particles. Japanese Patent Unexamined Publication No. 4-81447 discloses a water-based emulsion composition which is a mixture of a self-emulsifiable polyurethane and a water-based acrylic-resin emulsion which is cross-linkable at ambient temperature.

Similar to the above-mentioned acrylic ester paint, there has been a recent demand for a water-based fluorine-containing paint which is one-package type and capable of providing a coated film superior in water resistance, weather resistance, stain resistance and the like.

SUMMARY OF THE INVENTION

It is therefore an object of the first aspect of the present invention to provide a water-based fluorine-containing paint containing a hardener well dispersed in the paint.

It is therefore an object of the second aspect of the present invention to provide a water-based fluorine-containing paint which is chemically stable at ambient temperature, even after the hardener is added thereto, and thus usable as a one-package type paint.

According to a first aspect of the present invention, there is provided a first water-based fluorine-containing paint comprising:

a water-based emulsion containing water as a dispersion medium and a fluorine-containing copolymer as a disperse phase, said fluorine-containing copolymer being prepared by copolymerizing 30–65 mol % of a fluoroolefin, 14–69 mol % of a copolymerizable vinyl-containing compound, and 1–30 mol % of a first compound which is at least one of a hydroxyl-containing compound and a polymerizable carboxyl-containing compound; and 1–50 parts by weight of a hardener per 100 parts by weight of said fluorine-containing copolymer, said hardener being prepared by mixing a self-emulsifiable polyisocyanate with 0.01–1 part by weight, per part by weight of said polyisocyanate, of a second compound containing in the molecule an oxygthylene unit and an alkoxysilyl group.

According to the first aspect of the present invention, the inventors have unexpectedly found that, when the second compound is mixed with a self-emulsifiable polyisocyanate, the polyisocyanate becomes well dispersed in water contained in the first paint. That is, the hardener which is a mixture of the polyisocyanate and the second compound is well dispersed in the paint. With this, a coated film prepared by applying the first paint becomes homogeneous and exhibits a good water resistance, a good stain resistance and a good weather resistance, which are directly derived from a fluororesin contained in the first paint. The first paint can be easily prepared by mixing together the water-based emulsion and the hardener at a coating site, because the hardener is well mixed with and well dispersed in the emulsion.

According to a second aspect of the present invention, there is provided a second water-based fluorine-containing paint comprising:

a water-based emulsion containing water as a dispersion medium and a fluorine-containing copolymer as a disperse phase, said fluorine-containing copolymer being prepared by emulsion polymerization of 30–65 mol % of a fluoroolefin, 0.1–20 mol % of a polymerizable unsaturated carboxylic acid represented by the general formula (1), 1–30 mol % of a polymerizable allyl compound represented by the general formula (2), and 20–65 mol % of a first compound which is one of a vinyl ester and a vinyl ether; and a hardener which is a second compound containing in the molecule at least two hydrazino groups, $$CH_2=CH-(CH_2)_n-COOH \quad (1)$$

where n is an integer from 7 to 9,

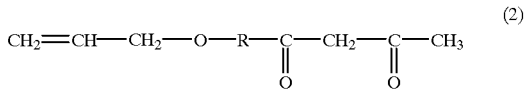

(2)

where R represents —(AO)$_n$— in which A is an alkylene group having a carbon atom number from 2 to 4, and n is an integer from 0 to 20.

According to the second aspect of the present invention, the inventors unexpectedly found that the second paint does not cure until its use and thus can be stably stored until its use, even after the above-mentioned special hardener has been mixed with the water-based emulsion. Therefore, the second paint can be used as an one-package paint. After the second paint is applied to a substrate to form a coated film thereon, cross-linking of the second paint proceeds at ambient temperature. The thus formed coated film is superior in water resistance, weather resistance, stain resistance and the like. Furthermore, the second paint does not contain an organic solvent. This is an advantage from a view point of environment.

DESCRIPTION OF THE PREFERRED EMBODIMENTS

In the following, a water-based fluorine-containing paint according to the first and second aspects of the present invention will be described in detail.

According to the first and second aspects of the present invention, there is used 30–65 mol % of a fluoroolefin as a monomer for preparing the fluorine-containing copolymer, based on the total number of moles of all the monomers. The mol percentages of the other monomers are also defined in the same manner as this fluoroolefin. Examples of the fluoroolefin are chlorotrifluoroethylene, tetrafluoroethylene, hexafluoropropene, hexafluoroisobutene, vinylidene fluoride, trifluoroethylene, and vinyl fluoride. If it is less than 30 mol %, a coated film becomes inferior in weather resistance. If it is greater than 65 mol %, the fluorine-containing copolymer does not well disperse in water.

According to the first aspect of the present invention, there is used 14–69 mol % of a copolymerizable vinyl-containing compound for preparing the fluorine-containing copolymer. If it is less than 14 mol %, the copolyinerization rate is lowered too much. If it is greater than 69 mol %, the fluorine content of the copolymer becomes too small. The vinyl-containing compound is not limited to a particular one. Preferable examples of this compound are vinyl esters, vinyl ethers, and allyl ethers. Of vinyl esters, polymerizable ester compounds each having carbonyl group in the molecule can be used. Examples of the ester compounds are vinyl acetate, vinyl propionate, vinyl lactate, vinyl pivalate, vinyl caproate, vinyl caprylate, vinyl laurate, vinyl myristate, vinyl palmitate, vinyl stearate, neononanoic acid ethenyl ester, neodecanoic acid ethenyl ester, and vinyl benzoate. As commercial products of neononanoic acid ethenyl ester and neodecanoic acid ethenyl ester, VEOVA-9 and VEOVA-10 made by Showa-Shell Chem. Co. can be cited, respectively. Examples of the vinyl ethers are methyl vinyl ether, ethyl vinyl ether, butyl vinyl ether, and cyclohexyl vinyl ether. Examples of the allyl ethers are ethylallyl ether, butylallyl ether, benzylallyl ether, allylglycidyl ether, cyclohexylallyl ether, and allyl acetoacetate. Furthermore, a vinyl ether or ally ether. which has a polyalkylene glycol chain such as polyethylene glycol chain or polypropylene glycol chain, may be used as the vinyl-containing compound, for the purpose of more easily emulsifying the fluorine-containing copolyner. Still furthermore, an alkoxyvinyl silane compound such as trimethoxyvinyl silane, triethoxyvinyl silane or diethoxymethoxyvinyl silane may be used as the vinyl-containing compound. It is optional to add an olefin such as ethylene, propylene or vinyl chloride to the vinyl-containing compound.

According to the first aspect of the present invention, there is used 1–30 mol % of a first compound which is at least one of a polymerizable hydroxyl-containing compound and a polymerizable carboxyl-containing compound. The first compound is used for cross-linking the first paint. If it is less than 1 mol %, the cross-linking of the first paint becomes insufficient. With this, the coated film becomes inferior in weather resistance and water resistance. If it is greater than 30 mol %, the fluorine-containing copolymer becomes too much in hydrophilicity. With this, a coated film becomes inferior in water resistance.

According to the first aspect of the present invention, examples of the potymerizable hydroxyl-containing compound are hydroxyl-containing allylethers, hydroxyl-containing vinyl ethers and crotonic-acid modified compounds. Examples of the hydroxyl-containing allylethers are alkylene glycol monoallyl ethers such as ethylene glycol monoallyl ether, propylene glycol lionoallyl ether, diethylene glycol monoallyl ether, polyethylene glycol monoallyl ether, and hydroxybutyl allyl ether. Examples of the hydroxyl-containing vinyl ethers are hydroxyalkyl vinyl ethers such as hydroxymethyl vinyl ether, hydroxyethyl vinyl ether, hydroxybutyl vinyl ether, hydroxypentyl vinyl ether and hydroxyhexyl vinyl ether, and polyethylene glycol monovinyl ethers such as diethylene glycol monovinyl ether. An example of the crotonic-acid modified compounds is hydoxyethyl crotonic acid. Furthermore, glycerol monoallyl ether and ε-caprolactone-modified allyl ether or vinyl ether, each of which has two hydroxyl groups in the molecule, can be cited as examples of the hydroxyl-containing compound, too.

According to the first aspect of the present invention, the above-mentioned polymerizable carboxyl-containing compound is not limited to a particular one, as long as it has a carboxyl group and a polymerizable double bond in the molecule. Preferable examples of the carboxyl-containing compound are vinylacetic acid, decenoic acid, 10-undecylenic acid, and crotonic acid. Of these, 10-undecylenic acid is particularly preferable, because 10-undecylenic acid introduced into the fluorine-containing copolymer serves as a reactive emulsifying agent. Therefore, it is possible to reduce the amount of an emulsifying agent used in the preparation of the water-based emulsion. With this, a coated film is further improved in water resistance and weather resistance.

According to the second aspect of the present Invention, the polyinerizable unsaturated carboxylic acid represented by the general formula (1) has a total carbon number from 10 to 12 and consists of only a straight-chain alkenyl group and carboxyl group. It is considered that this carboxylic acid contributes to improve the coated film in weather resistance, as shown in the aftermentioned Examples 5–10, in spite of the fact that this coated-film is formed by applying the water-based emulsion paint. In other words, it is considered that the carboxylic acid serves as a reactive emulsifying agent, and thus it becomes possible to reduce the amount of the emulsifying agent used in the emulsion polymerization. With this, it also becomes possible to reduce the amount of the remaining emulsifying agent in the paint, and thus it becomes possible to suppress the decline in weather resistance of the coated film. The carboxylic acid, serving as an emulsifying agent, exists at the interface between particles of the disperse phase and water (dispersion medium), and thus is always in contact with water. However, the carboxylic acid is at this interface in a chemically stable manner, due to that it does not have a hydrolyzable structure in the molecule. It is considered that this characteristic of the carboxylic acid contributes to improve the emulsion stability in the polymerization reaction, the stability of the water-based emulsion during storage thereof and the mechanical stability of the same, the stability of the water-based paint during storage thereof, and weather resistance of the coated film.

According to the second aspect of the present invention, it is important that n is from 7 to 9 in the general formula (1) representing the polymerizable unsaturated carboxylic acid. If n is less than 7, the carboxylic acid tends to be dissolved in water and thus does not serve as an emulsifying agent. Furthermore, the yield of polymerization is reduced. If n is greater than 9, the carboxylic acid becomes too high in hydrophobicity. With this, the emulsification action of the carboxylic acid is substantially lowered. The amount of the carboxylic acid is front 0.1 to 20 mol % and preferably from 3 to 10 mol %. If it is less than 0.1 mol %, the carboxylic acid does not effectively function as a reactive emulsifying agent. If it is greater than 20 mol %, the coated film becomes inferior in water resistance, Examples of the carboxylic acid are 9-decanoic acid, 10-undecylenic acid, 11-dodecylenic acid. of these, 10-undecylenic acid is particularly preferably used.

According to the second aspect of the invention, the polymerizable allyl compound represented by the above-described general formula (2) is copolymerized with the other monomers for introducing acetoacetyl group into the fluorine-containing copolymer. This acetoacetyl group serves for cross-linking the copolymer. "AO" represented by "R" in the general formula (2) is an oxyalkylene group, and its nonlimitative four examples are as follows.

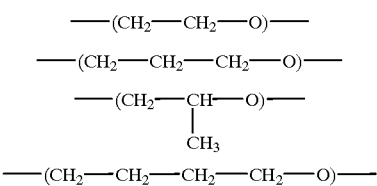

In the general formula (2), "(AO)$_n$," may be a single oxyalkylene group or a mixture of at least two oxyalkylene groups. If "n" in the general formula (2) is greater than 20, the coated film becomes inferior in water resistance. The method of producing the polymerizable allyl compound is not limited to a particular one. For example, the polymerizable ally compound is prepared by reacting a hydroxyl-containing allyl compound with diketene. In this reaction, the polymerizable allyl compound is obtained with a high yield by mixing and stirring these compounds together at room temperature or at a temperature not higher than 80° C. An example of commercial product of the polymerizable allyl compound is allyl acetoacetate. It is considered that the polymerizable allyl compound tends to be concentrated at the outer surface of particles of the disperse phase of the water-based emulsion under a condition that the allyl compound is coexistent with the polymerizable unsaturated carboxylic acid. With this, the hardening reaction is considered to proceed effectively. The amount of the polymerizable allyl compound is from 1 to 30 mol % and preferably from 2 to 10 mol %. If it is less than 1 mol %, the degree of cross-linking of the coated film becomes insufficient. If it is greater than 30 mol %, the fluorine-containing copolymer itself becomes inferior in weather resistance. Furthermore, the coated film becomes inferior in strength, because it is necessary to increase the amount of hardener to a certain level in accordance with the amount of the allyl compound.

According to the second aspect of the present invention, the first compound which is one of a vinyl ester and a vinyl ether is not particularly limited. Examples of this vinyl ester are polymerizable ester compounds each having carbonyl group in the molecule, such as those examples of the vinyl ester according to the first aspect of the present invention and vinylcyclohexyl acid. Examples of the vinyl ether are those examples of the copolymerizable vinyl ether of the first aspect of the present invention and those examples of the hydroxyl-containing polymerizable vinyl ether thereof. Furthermore, a vinyl ether having a polyalkylene glycol chain may be used as the vinyl ether, as is above-described in accordance with the first aspect of the present invention. It is also optional to add, to the first compound, an alkoxyvinyl-silane compound, a hydroxyl-containing allyl ether, a hydroxyl-containing crotonic acid modified compound, and/or a glycerol monoallyl ether or ε-caprolactone modified allyl ether, which has two hydroxyls in the molecule, as is above-described in accordance with the first aspect of the present invention. The amount of the first compound is from 20 to 65 mol % and preferably from 30 to 50 mol %. If it is less than 20 mol %, the polymerization rate becomes too low. If it is greater than 65 mol %, the coated film becomes inferior in weather resistance due to that the fluorine content of the copolymer becomes too low.

According to the second aspect of the present invention, vinyl ester resin, acrylic resin and/or methacrylic resin may be previously mixed with the first compound, prior to the copolymerization, and can be copolymerized. The addition of these resins contributes to improve the coated film in gloss and in stain resistance. In particular, the coated film is improved in easiness to wipe off stains thereon, by adding at least one of these resins, which has a glass transition point nor lower than 30° C. Such resin contributes to prevent the coated film from having stains thereon in outdoor exposure test. These resins are not particularly limited as long as these are dissolved in the first compound and compatible with the fluorine-containing copolymer.

According to the second aspect of the present invention, it is optional to add an olefin such as ethylene, propylene or vinyl chloride to the other monomers, for improving the fluorine-containing copolymer in characteristics.

According to the first aspect of the present Invention, the fluorine-containing copolymer is obtained by copolymerizing the above-mentioned essential three kinds of monomers together, in the presence of a commonly used radical polymerization initiator. The manner of the copolymerization reaction is not particularly limited. For example, the object is accomplished by solution polymerization, suspension polymerization, or emulsion polymerization. Of these, emulsion polymerization is particularly preferable, because it provides the fluorine-containing copolymer dispersed in the water-based emulsion.

According to the first aspect of the present invention, an anion or nonion emulsifying agent can be used as an emulsifying agent in the emulsion polymerization. Examples of the anion emulsifying agent are alkylberzenesulfonate, alkylsulfate, polyoxyethylenealkylphenolsulfate, styrenesulfonate. vinylsulfate, and derivatives of these. These salts may be produced by the interaction of the acids (e.g., alkylsulfuric acid) and bases (e.g., alkali metal hydroxides and volatile bases). Examples of the volatile bases are ammonia and triethylamine. Examples of the above-mentioned nonion emulsifying agent are polyoxyethylenealkylphenolethers, polyoxyethylenealkylethers, polyoxyethylene higher fatty acid esters, ethyleneoxide-propyleneoxide block copolymers, fluoroalkylcarboxylates, and fluoroalkylsulfates.

In the present invention, the amount of the emulsifying agent varies depending on composition of the monomers and on the concentration of the monomers in water. In fact, according to the first aspect of the present invention, it is preferable to use 0.5–10 parts by weight of the emulsifying agent per 100 parts by weight of the total of all the monomers. If it is less than 0.5 parts by weight, the monomers may not sufficiently disperse in the water phase. If it is greater than 10 parts by weight, the coated film may become inferior in water resistance and weather resistance. According to the second aspect of the present invention, it is preferable to use less than 5 parts by weight of the emulsifying agent per 100 parts by weight of the total of all the monomers. If it is greater than 5 parts by weight, the coated film may become inferior in water resistance and weather resistance.

According to the second aspect of the present invention, the polymerizable unsaturated carboxylic acid serves as an emnulsifying agent, as stated above. Therefore, an emulsifying agent may be omitted, or its amount may substantially be reduced. The above-exemplified anion or nonion emulsifying agent as to the first aspect of the present invention may be used together with the polymerizable unsaturated carboxylic acid.

According to the first and second aspects of the present invention, a radical polymerization initiator usable in the emulsion polymerization for preparing the fluorine-containing copolymer is not limited to a particular type, as long as it is usable in a common emulsion polymerization, A water-soluble initiator is particularly preferably used. Examples of water-soluble initiator are inorganic peroxides such as hydrogen peroxide, organic peroxides such as cumene hydroperoxide, benzoyl peroxide, t-butyl hydroperoxide, disuccinic acid peroxide, diglutaric acid peroxide. persulfates such as ammonium persulfate, potassium persulfate and sodium persulfate, and azo-initiators such as hydrochloride of azobisisobutylanidine, azobisisobutyronitrile and azobiscyanovaleric acid. Further examples of water-soluble initiator are redox initiators which are combinations of the above-exemplified initiators and reducing agents such as sodium sulfite, sodium thiosulfate, sodium bisulfite, sodium metabisulfite, sodium bithiosalfate, formaldehyde sodium sulfoxylate and reducing sugar. To the redox initiator, it is optional to add a small amount of iron, ferrous salt, silver sulfate, copper sulfate and the like.

According to the first and second aspects of the present invention, the amount of the radical polymerization initiator varies depending on its type, the concentration of the monomers in the water-based emulsion, the polymerization temperature and the like, and is preferably from 0.05 to 5 parts by weight per 100 parts by weight of the total of all the monomers. The radical polymerization initiator nay be added at one time or several times.

According to the first and second aspects of the present invention, the amount of water used in the emulsion polymerization varies depending on the monomer composition, the emulsifying agent concentration and the like, and this water may be from 50 to 400 parts by weight and particularly preferably from 70 to 150 parts by weight per 100 parts by weight of the total of all the monomers. If it is less than 50 parts, the particle diameter of disperse phase in the emulsion may become too large. With this, the emulsion may not be chemically stable during storage, or the time until the coated film sets to touch may become too long. That is; at this time, when the coated film is touched with fingers, the fingers are not stained thereby. If it is greater than 400 parts, the solid matter concentration of the water-based emulsion may become too low. The solid matter concentration of the emulsion may be adjusted by adding water to or removing water from the emulsion polymerization product.

According to the first and second aspects of the present invention, the temperature of the copolymerization reaction varies according to the type of the radical polymerization initiator, but usually is within a range from 0 to 150° C.

According to the first aspect of the present invention, the water-based emulsion may be obtained by dispersing, in water, a varnish of the fluorine-containing copolymer obtained by suspension polymerization or solution polymerization where a common organic solvent is used. The manner of dispersing the varnish in water is not particularly limited. For example, a solution of the fluorine-containing copolymer dissolved in a non-aqueous organic solvent may be introduced into water in the presence of an emulsifying agent or without using the agent. The non-aqueous organic solvent is not particularly limited, as long as it is usable as a common non-aqueous thinner for paint. As this solvent, toluene, xylene, butyl acetate, ethyl acetate, propylene glycol methyl acetate, alkyl silicate, or the like is particularly preferably used. This alkyl silicate is referred to as tetraalkoxysilane or its condensates. Examples of the alkyl silicate are tetramethoxysilane, tetraethoxysilane, tetraisopropoxysilane, tetra-n-propoxysilane, tetra-n-butoxysilane, tetra-2-methoxyethoxysilane, tetra-2-ethylhexyloxysilane, and condensates of these. Various commercial alkyl silicates are available. These silicates are prepared by at first partially hydrolyzing tetraalkoxysilane and then condensing the partial hydrolysate, and are different in condensation degree, structure, and the type of alkoxyl group. Examples of these silicates are M SILICATE 51, ETHYLSILICATE 40, and ETHYLSILICATE 45, all of which are trade names of TAMA CHEMICAL INDUSTRY CO. It is possible to use an alkyl silicate having a silica component concentration up to 57 wt %, by further hydrolyzing the commercial alkyl silicate and thus by increasing the silica component concentration thereof. It is not preferable to use an alkyl silicate which is partially hydrolyzed but not condensed enough, because such alkyl silicate is hydroohilic or soluble in water and thus is not well dispersed in the water-based emulsion.

According to the first aspect of the present invention, the solid matter concentration of the water-based emulsion is preferably from 10 to 70 wt %. If it is lower than 10 wt %, the paint volume may become too large. This is inconvenient from a view point of storing or transporting the paint. If it is higher than 70 wt %, the water-based emulsion may become too high in viscosity. With this, it becomes difficult to smoothly apply the paint to a substrate.

In the first aspect of the present invention, as stated above, the hardener is prepared by uniformly mixing a self-emulsifiable polyisocyanate with 0.01–1 part by weight, per part by weight of the polyisocyanate, of the second compound containing in the molecule an oxyethylene unit and an alkoxysilyl group. If the second compound is less than 0.01 parts by weight, the polyisocyanate is not sufficiently dispersed in water. With this, cross-linking of the coated film is not uniformly distributed. Thus, the coated film becomes inferior in water resistance, weather resistance, stain resistance and the like. if the second compound is greater than 1 part by weight, the alkoxysilyl group content of the paint becomes too high. With this, cracks tend to occur in the coated film in the course of cure thereof.

In the first aspect of the present invention, the self-emulsifiable polyisocyanate is not limited to a particular type, as long as it has a skeleton of polyisocyanate and a hydrophilic group such as oxyethylene group. Examples of such skeleton are hexamethylene diisocyanate, tolylene diisocyanate, xylene diisocyanate, isophorone diisocyanate, diphenylmethane diisocyanate, hydrogenated tolylene diisocyanate, hydrogenated xylene diisocyanate, and hydrogenated diphenylmethane diisocyanate. Examples of commercial products of the self-emulsifiable polyisocyanate are BAYHYDUR TPLS-2032 (trade name) of Sumitomo Bayer Urethane Co. and DC-3900, DC-3901 and DC-3712 (trade names) of Nippon Polyurethane Industry Co. Each of these products contains oxyethylene group in the molecule.

In the first aspect of the present invention, the second compound to be mixed with the self-emulsifiable polyisocyanate preferably has an oxyethylene repeating unit number from 1 to 20. If the second compound does not have an oxyethylene unit, it becomes difficult to achieve self-emulsification of the second compound. if the oxyethylene repeating unit number exceeds 20, the second compound flay be dissolved in water. Examples of alkoxysilyl group contained in the second compound's molecule are methyldiethoxyrsilyl group, triethoxysilyl group, methyldimethoxysilyl group, trimethoxysilyl group, tripropoxysilyl group, triisopropoxysilyl group, tris(β-methoxyethoxy)silyl group, tributoxysilyl group, tri(2-methoxyethyl)silyl group, and tri (2-ethylhexyloxy)silyl group.

In the first aspect of the present invention, the method of producing the second compound is not limited to a particular one. The second compound can be obtained, for example, by reacting a compound containing a reactive group and an alkoxysilyl group, with a polyoxyethylene derivative containing a reactive group. In this reaction, there occurs an addition reaction between hydroxyl and isocyanate group, a coupling reaction between epoxy or halogeno group and amino group, or the like. As another example, the second compound can be obtained by at first vinylating terminal(s) of a polyoxyethylene having hydroxyl group(s) at one or both of the terminals thereof by a metal alcoholate, a hologenated allyl compound or the like, then silylating the terminal(s) by trichlorosilane, and then alkoxysilylating the terminal(s) by a metal alcoholate. It is particularly preferable to prepare the second compound by reacting a polyoxyethylene derivative having an active-hydrogen-containing reactive group (e.g., hydroxyl, carboxyl, amino and mercapto groups) with a compound containing isocyanate group (—N=C=O) and alkoxysilyl group, because this reaction does not require complicated reaction steps. An example of the compound to be reacted with the polyoxyethylene derivative is an alkoxysilane represented by the general formula (3),

OCN(CH$_2$)$_3$SiX$_n$Y$_{(3-n)}$     (3)

where Y is hydrogen or a hydrocarbon group having a carbon atom number from 1 to 8, X is an alkoxyl having a carbon atom number from 1 to 3, and n is an integer from 1 to 3. Preferable examples of this alkoxysilane are γ-isocyanatepropylmethyldiethoxysilane, γ-isocyanatepropyltriethoxysilane, γ-isocyanatepropylmethyldimethoxysilane, γ-isocyanatepropyltrimethoxysilane. Exemplary commercial products of the alkoxysilane are Y-5187 (trade name) having trimethoxysilyl group and Y-9030 (trade name) having triethoxysilyl group, both of which are made by Nippon Unicar Co.

In the first aspect of the present invention, it is preferable that the above-mentioned polyoxyethylene derivative has in the molecule the oxyethylene unit and at least one reactive hydroxyl. It is particularly preferable that the polyoxyethylene derivative has an oxyethylene repeating unit number from 1 to 20. Examples of the polyoxyethylene derivative are oxyethylene, polyoxyethylene, polyoxyethylenealkylarylether, polyoxyethylenealkylether, polyoxyethylenealkylester, oxyethylenealkylarmine, polyoxyethylenearylether, polyoxyethylenearylester, sorbitan fatty acid esters, polyalcohols (e.g., glycerol) modified by oxyethylene, oxyethylene-modified silicones. The polyoxyethylene chain of these examples may be copolymerized with another oxyalkylene such as oxypropene or oxytetramethylene. This copolymerization may be random copolymerization or block copolymerization.

In ten first aspect of the present invention, it is assumed that the second compound is provided with self-emulsification property due to amphipathic property thereof. That is, the second compound has hydrophilicity caused by the polyoxyethylene segment thereof and hydrophobicity caused by the alkoxysilyl segment thereof. It is considered that the polyoxyethylene segment improves compatibility between the second compound and the self-emulsifiable polyisocyanate and thus that this polyisocyanate is stably self-emulsified. The alkoxysilyl segment of the second compound is hydrolyzed and then cross-linked, This characteristic of the alkoxysilyl segment is considered to improve the coated film in water resistance and stain resistance.

In the first aspect of the present invention, at least one other optional compound may be added to the hardener, preferably in an amount not higher than 30 wt % of the harder. Examples of this optional compound are common polyisocyanates (i.e., non-self-emulsifiable polyisocyanates) for improving cross-linking of the first paint, organic solvents and oligomers for lowering viscosity of the hardener, various emulsifying agents for assisting in self-emulsification of the self-emulsifiable polyisocyanate, alkylsilicates for improving hardness and stain resistance of the coated film, and water-soluble amine catalysts for accelerating cross-linking of the first paint. The water-soluble amine catalyst may be adled to the water-based emulsion and the hardener prior to mixing of these, or may be added to the mixture of these. The amount of the amine catalyst is preferably not greater than 3 parts by weight per 100 parts by weight of the fluorine-containing copolymer contained in the water-based emulsion. As to the amine catalyst, it is preferable to use an amine catalyst which is low in catalytic action for catalyzing the reaction of isocyanate group of the hardener with water and which effectively catalyzes hydrolysis of alkoxysilyl group of the second compound. Examples of the amine catalyst are N,N,N',N'-tetramethyldiamino compounds such as N,N,N',N'-tetramethyldiaminoethane, N,N,N',N'-tetramethyldiaminohexane and N,N,N',N'-tetramethyldiamino-butane, N-methylmorpholine, N-ethylmorpholine, N-methyl-piperazine, N,N'-dimethylpiperazine, N,N'-dimethylbenzyl-amine, and N,N'-dimethyldodecylamine. Of these, N,N,N',N'-tetramethyldiamino compounds are particularly preferable in view of characteristics of the coated film surface.

In the first aspect of the present invention, as stated above, the hardener is in an amount from 1 to 50 parts by weight per 100 parts by weight of the fluorine-containing copolymer of the water-based emulsion. If it is less than 1 part by weight, the degree of cross-linking of the coated film becomes insufficient. With this, the coated film becomes substantially inferior in water resistance and stain resistance. If it is greater than 50 parts by weight, the coated film becomes inferior in weather resistance.

In the first aspect of the present invention, the first paint may be prepared by mixing the water-based emulsion with the hardener which has been previously emulsified in water, or with the hardener itself.

According to the second aspect of the present invention, the above-mentioned second compound containing in the molecule at least two hydrazino groups (—NHNH$_2$) is used as a hardener to be mixed with the water-based emulsion. With this, the second paint can be used as a one-package type paint which is crosslinkable at ambient temperature. It is assumed that cross-linking proceeds by dehydration between the hydrazino group and the functional group of the poly-merizable ally compound. In other words, the second paint is chemically stable at ambient temperature, even after the hardener has been added to the water-based emulsion, and cross-linking does not proceed in water. However, as water evaporates from the coated film, dehydration between the acetoacetyl group and the hydrazino group proceeds. and thereby cross-linking proceeds to harden the coated film.

According to the second aspect of the present invention, examples of the second compound as a hardener are dicarboxylic acid dihydrazides each having a carbon atom number from 2 to 10, such as oxalic acid dihydrazide, malonic acid dihydrazide, succinic acid dihydrazide, sebacic acid dihyrazide, adipic acid dibyrazide, glutaric acid dihyrazide, maleic acid dihyrazide and fumaric acid dihydrazide, water-soluble fatty acid dihyrazides such as ethylene-1,2-dihydrazide, propylene-1,3-dihyrazide and butylene-1,4-dihydrazide, and water-soluble hydrazino-containing polymers each having a side chain to which hydrazino group has been introduced by polymerizing a hydrazino-containing vinyl compound or by copolymerizing this vinyl compound with another monomer. The second compound is easily dissolved in water by heating. The thus prepared aqueous solution of the second compound can be well mixed with the water-based emulsion. The amount of the second compound is preferably from 1 to 30 parts by weight and more preferably from 2 to 15 parts by weight, per 100 parts by weight of the fluorine-containing copolymer. If it is less than 1 part by weight, cross-linking may not sufficiently proceed in the coated film. If it is greater than 30 parts by weight, the coated film may become inferior in strength.

In the first and second aspects of the present invention, it is optional to add other additives to the disperse phase or to water (dispersion medium) of the paint, such as thickener, coalescing agent (e.g., butyl cellosolve and butylcarbitol acetate), pigment dispersant (e.g., sodium tripolyphosphate, sodium polyacrylate and nonion emulsifying agents), dispersion assisting agent, pigment (e.g., titanium white, cadmium yellow, carbon black, phthalocyanine compounds and azo compounds), defoaming agent, antisetting agent, levelling agent, ultraviolet absorbing agent, light stabilizer, rust preventive agent, and antifungus agent.

The following nonlimitative Examples 1–4 are illustrative of the first aspect of the present invention, and the following Comparative Examples 1–4 are not thereof. in the following, the amount of each monomer expressed by mol % for preparing the fluorine-containing copolymer is based on the total number of moles of all the monomers.

EXAMPLE 1

At a first step, a water-based emulsion according to the present invention was prepared as follows.

At first, as shown in Table 1, a 2-liter stainless steel autoclave provided with an electromagnetic stirrer was charged firstly with a monomer mixture of 71 g (27.0 mol %) of vinyl butyrate (VBu), 43 g (10.0 mol %) of neononanoic acid ethenyl ester, VEOVA-9 (V-9), 30 g (10.0 mol %) of hydroxybutyl allyl ether (HBAE) as a first compound, 13 g (3.0 mol %) of 10-undecylenic acid (UA) as a first compound, and 6 g of nonion emulsifying agent, NEWCOL 504 (trade name) of Nippon Nyukazai Co., then with an acid-accepting-agent aqueous solution prepared by dissolving 0.3 g of sodium carbonate decahydrate in 30 g of ion-exchanged water, then with a polymerization initiator aqueous solution prepared by dissolving 0.5 g of ammonium persulfate in 30 g of ion-exchanged water, and then with 680 g of ion-exchanged water. The thus prepared mixture was uniformly stirred. Then, the gas atmosphere in the autoclave was replaced by nitrogen gas, and this operation was repeated three times. Then, 134 g (50 mol %) of chlorotrifluoroethylene (CTFE) was introduced into the autoclave. Then, the polymerization reaction was carried out at 50° C. for 20 hr to produce a fluorine-containing copolymer A. Then, the reaction liquid was taken out of the autoclave and then concentrated to adjust the solid matter concentration to 50 wt %. Then, pH value of the reaction liquid was adjusted to 8, using 28% aqueous ammonia, thereby to obtain a water-based emulsion A of the fluorine-containing copolymer A.

The thus prepared water-based emulsion A was subjected to the following evaluation tests. The results of the tests are shown in Table 1. In a storage stability test, the water-based emulsion A was stored at 50° C. for one month. After the test, the condition of the water-based emulsion A was observed and then classified into "A" (there was no change in the condition) or "B" (there was a settlement of disperse phase particles). In a mechanical stability test, the water-based emulsion A was stirred with a stirrer at a rotation rate of 5,000 rpm for 5 min. After the test, the condition of the water-based emulsion A was observed and then classified into "A" (there was no change in the condition) or "B" (there was an increase of particle diameter of disperse phase).

The aftermentioned water-based emulsions B–E were prepared in the same manner as that of the water-based emulsion A except that selective changes were made as shown in Table 1 in the kind and quantity of the monomers. Furthermore, the water-based emulsions B–E were subjected to the same evaluation tests as those of the water-based emulsion A.

TABLE 1

| | Water-based Emulsion | | | | |
|---|---|---|---|---|---|
| | A | B | C | D | E |
| Charged Monomer (mol %) | | | | | |
| CTFE | 50.0 | 45.0 | 40.0 | 50.0 | 45.0 |
| VBu | 27.0 | — | 20.0 | 30.0 | — |
| V-9 | 10.0 | — | 15.0 | — | 30.0 |
| EVE* | — | 10.0 | — | 10.0 | 10.0 |
| CHVE* | — | 28.0 | — | — | 15.0 |
| HBAE | 10.0 | — | — | — | — |
| HBVE* | — | 15.0 | 5.0 | 5.0 | — |
| ε-CAE* | — | — | 5.0 | 15.0 | — |
| UA | 3.0 | 2.0 | 5.0 | — | — |
| Solid Matter Conc. (%) | 19 | 22 | 22 | 20 | 22 |
| Particle Diameter (μm) | 0.18 | 0.21 | 0.16 | 0.22 | 0.20 |
| Storage Stability | A | A | A | A | A |
| Mechanical Stability | A | A | A | A | A |

*EVE: ethyl vinyl ether; CHVE: cyclohexyl vinyl ether; HBVE: hydroxybutyl vinyl ether; and ε-CAE: ε-caprolactone-modified allyl ether made by DATCEL CHEMICAL INDUSTRIES CO.

At a second step, a second compound according to the first aspect of the present invention was prepared as follows.

At first, as shown in Table 2, a 2-liter stainless steel autoclave provided with an electromagnetic stirrer was charged with 400 g (33 mol %) of a polyoxyethylene (PEG-200 (trade name) of SANYO CHEMICAL INDUSTRIES, LTD.) which has an average molecular weight of 200 and hydroxyl group at its terminal(s), and 988 g (67 mol %) of an isocyanate (Y-9030 (trade name) of Nippon Unicar Co.) which contains triethoxysilyl group and is represented by OCN—$(CH_2)_3$—Si—$(OEt)_3$. Then, the gas atmosphere in the autoclave was replaced by nitrogen gas, and this operation was repeated three times. Then, the reaction was carried out at 100° C. for 5 hr, thereby to prepare the second compound A. The $^1$H-NMR measurement was conducted for identifying the reaction product and for determining the yield. In this measurement, particular peaks at 4.2 ppm and 5.1 ppm, suggesting that urethane bond was formed by the reaction, were observed. The yield was determined by the integral ratio of $^1$H-NMR spectrum peaks. The result is shown in Table 2.

The aftermentioned second compounds B–C were respectively prepared in the same manner as that of the second compound A except that selective changes were made as shown in Table 2 in the kind and quantity of the raw materials. After the reactions to obtain the second compounds B–C, xylene used as a solvent was removed by distillation under reduced pressure.

TABLE 2

| Charged Compounds (mol % (g)) | Second Compounds | | |
|---|---|---|---|
| | A | B | C |
| PEG-200 | 33 (400) | — | — |
| NEWCOL-1105* | — | 50 (609) | 50 (609) |
| Y-5187* | — | — | 50 (307) |
| Y-9030 | 67 (988) | 50 (370) | — |
| xylene | — | 30 (370) | 30 (393) |
| Yield (%) | 93 | 93 | 92 |

*NEWCOL-1105: nonion surfactant; and Y-5187 (trade name): trimethoxysilyl-containing isocyanaate of Nippon Unicar Co.

At a third step, a hardener was prepared as follows. As shown in Table 3, 1 part by weight of a self-emulsifiable polyisocyanate, BAYHYDUR TPLS-2032 (trade name) of Sumitomo Bayer Urethane Co., which has oxyethylene group and isocyanate group in the molecule, was mixed with 0.33 parts by weight of the second compound A obtained by the second step, thereby to prepare a hardener A.

Similarly, each of the aftermentioned hardeners B–E was prepared by mixing a self-emulsifiable polyisocyanate with a second compound, as shown in Table 3.

TABLE 3

| | Hardeners | | | | |
|---|---|---|---|---|---|
| | A | B | C | D | E |
| Self-emulsifiable Polyisocyanates | | | | | |
| BAYHYDUR TPLS-2032 | 1 | — | — | 1 | 1 |
| DC-3901 | — | 1 | 1 | — | — |
| Second Compounds | | | | | |
| A | 0.33 | — | — | 1.1 | — |
| B | — | 0.25 | — | — | — |
| C | — | — | 0.4 | — | — |
| Polyisocyanate/Second Compounds | 0.33 | 0.25 | 0.4 | 1.1 | — |

At a fourth step, as shown in Table 4, 24 parts by weight of the hardener A obtained by the third step, per 100 parts by weight of the fluorine-containing copolymer A, was added to the water-based emulsion A obtained by the first step. This mixture was uniformly stirred to obtain a water-based fluorine-containing paint A.

EXAMPLES 2–4

In each of these examples, Example 1 was repeated except that selective changes were made as shown in Table 4 in the kind and quantity of the water-based emulsion and of the hardener and that 0.5 parts by weight of N,N,N',N'-tetramethyldiaminohexane (amine catalyst) was added to the mixture of the water-based emulsion and the hardener to prepare the water-based fluorine-containing paint.

As is seen from Table 4, the water-based emulsion C of the fluorine-containing copolymer C was used in Example 2; the water-based emulsion D of the fluorine-containing copolymer D was used in Example 3; and the water-based emulsion A of the fluorine-containing copolymer A was used in Example 4.

COMPARATIVE EXAMPLES 1–4

In each of these comparative examples, Example 1 was repeated except that selective changes were made as shown in Table 4 in the kind and quantity of. the water-based emulsion and of the hardener.

As is seen from Table 4, the water-based emulsion E of the fluorine-containing copolymer E was used in Comparative Example 1; the water-based emulsion A of the fluorine-containing copolymer A was used in Comparative Example 2; the water-based emulsion B of the fluorine-containing copolymer B was used in Comparative Example 3; and the water-based emulsion C of the fluorine-containing copolymer C was used in Comparative Example 4.

In Comparative Example 1, the hardener was omitted in the paint preparation (see Table 4), and both of the hydroxyl-containing compound and the polymerizable carboxyl-containing compound were omitted in the preparation of the water-based emulsion E (see Table 1). In comparative Example 2, the second compound was omitted in the hardener preparation (see Table 3). In Comparative Example 3, the weight ratio of the self-emulsifiable polyisocyanate to the second compound was higher than the essential range (0.01–1) of the present invention (see Table 3). In Comparative Example 4, the hardener was in an amount greater than the essential range (1–50 parts by weight per 100 parts by weight of the fluorine-containing copolymer) (see Table 4).

EVALUATION TESTS

In each of Examples 1–4 and Comparative Examples 1–4, the following evaluation tests were conducted on the paint and the coated film. The results are shown in Table 4.

In a dispersibility test on the paint, the hardener was added to the water-based emulsion. Then, this mixture was stirred for ten seconds. Then, the condition of the paint was observed with the naked eye to evaluate dispersibility of the disperse phase thereof. As to the results of the dispersibility test, "A" means that the paint was a homogeneous emulsion; "B" means that large particles of the hardener was found in a small amount; and "C" means that the hardener particles remained in and precipitated in the emulsion.

The coated film was prepared as follows. The obtained paint was applied to an aluminum plate having dimensions of 150 mm, 70 mm and 2 mm, with a spray gun. The coated film was cured at ambient temperature for three days. The thus obtained coated film having a thickness of 50 $\mu$m was subjected to evaluation tests as follows.

In a specular gloss test, the surface gloss of the coated film at 60 degrees was measured.

In a rubbing test, a piece of gauze moistened with xylene was rubbed against the coated film until 100 reciprocations thereof. Then, the surface condition of the coated film was examined with the naked eye. As to the results, "A" means that the surface condition was not changed at all: "B" means that scratches and/or blushing were formed on the coated film surface; and "C" means that the coated film swelled or dissolved.

In a water resistance test, the coated aluminum plate was immersed in water for two weeks. After that, the coated film condition was examined with the naked eye. As to the results, "A" means that the coated film was not changed at all; "B" means that a few blisters were generated on the coated film; "C" means that blisters were generated thereon, or that the coated film exfoliated; and "D" means that cracks were generated in the coated film.

In a stain resistance test, the coated aluminum plate was bent at the center line perpendicular to the longer sides to have upper and lower portions divided by the center line and to have an angle of 135 degrees between these portions. Then, the aluminum plate was arranged relative to the ground surface such that the upper and lower portions respectively have 45 and 90 degrees relative to the ground surface and exposed outdoors for 6 months in Kawagoe City, Saitama Prefecture, Japan. After the exposure, the existence of rain streaks on the lower portion was examined with the naked eye. As to the results, "A" means that no rain-streak was on the lower portion; "B" means that rain streaks were thereon but unobtrusive; and "C" means that rain streaks were thereon and obtrusive.

In a carbon resistance test, a 3% carbon/kerosene solution was dropped on the coated film. Then, the coated film was placed for one day at 20° C. under saturated vapor pressure of water and kerosene and then dried for two days at 40° C. Then, it was tried to wash off a stain(s) caused by dropping the solution thereon, in water, using an ultrasonic washer. Then, the surface condition of the coated film was examined by the naked eye. Then, when the stain still remained thereon, it was tried to wipe the stain off. Then, the surface condition of the coated film was again examined by the naked eye. As to the results, "A" means that the stain was almost washed off and then completely wiped off; "B" means that the stain unobtrusively remained but then wiped off; and "C" means that the stain obtrusively remained and was not wiped off.

In a weathering test, an accelerated testing was conducted with a sunshine weathermeter for 4,000 hr, and the surface gloss of each coated film at 60 degrees was measured before and after the weathering test to indicate the degree of weatherability by percentage of the retained gloss.

TABLE 4

| | Ex. 1 | Ex. 2 | Ex. 3 | Ex. 4 | Com. Ex. 1 | Com. Ex. 2 | Com. Ex. 3 | Com. Ex. 4 |
|---|---|---|---|---|---|---|---|---|
| Fluorine-containing Copolymers (parts by weight) | | | | | | | | |
| A | 100 | — | — | 100 | — | 100 | — | — |
| B | — | — | — | — | — | — | 100 | — |
| C | — | 100 | — | — | — | — | — | 100 |
| D | — | — | 100 | — | — | — | — | — |
| E | — | — | — | — | 100 | — | — | — |
| Hardeners (parts by weight) | | | | | | | | |
| A | 24 | — | — | 5 | — | — | — | — |
| B | — | 35 | — | — | — | — | — | 55 |
| C | — | — | 35 | — | — | — | — | — |
| D | — | — | — | — | — | — | 42 | — |
| E | — | — | — | — | — | 18 | — | — |
| Paint Dispersibility | A | A | A | A | — | C | A | A |
| Coated Film Characteristics | | | | | | | | |
| Specular Gloss (%) | 78 | 81 | 80 | 84 | 81 | 80 | 61 | 54 |
| Rubbing Test | A | A | A | A | C | A | A | A |
| Water Resistance Test | A | A | A | A | C | B | D | D |
| Stain Resistance | A | A | A | A | C | B | C | C |
| Carbon Resistance Test | A | A | A | A | C | B | A | B |
| Weatherability (%) | 93 | 89 | 88 | 91 | 62 | 84 | 58 | 73 |

The following nonlimitative Examples 5–10 are illustrative of the second aspect of the present invention, and the following Comparative Examples 5–8 are not thereof. In the following, the amount of each monomer expressed by mol % for preparing the copolymer is based on the total number of moles of all the monomers.

EXAMPLE 5

At a first step, a water-based emulsion according to the present invention was prepared as follows.

At first, as shown in Table 1, a 2-liter stainless steel autoclave provided with an electromagnetic stirrer was charged with 140 g (40 mol %) of vinyl butyrate (VBu), 24 g (5 mol %) of 10-undecylenic acid (UA), 19 g (5 mol %) of allyl acetoacetate (AAA) made by Showa Denko Co., 742 g of water, 0.7 g of potassium persulfate, 0.2 g of sodium carbonate decahydrate, and 4 g of a nonion emulsifying agent, NEWCOL-504 (trade name) of Nippon Nyukazai Co. Then, the gas atmosphere in the autoclave was replaced by nitrogen gas, and this operation was repeated three times. Then, 153 g (50 mol %) of CTFE was introduced into the autoclave. Then, the polymerization reaction was carried out at 50° C. for 22 hr, to produce a fluorine-containing copolymer F. Then, the gas atmosphere in the autoclave was removed. After that, the reaction liquid was taken out of the autoclave, and then concentrated thereby to obtain a water-based emulsion F having a solid matter concentration of 48%.

The aftermentioned water-based emulsions G–N were prepared in the same manner as that of the water-based emulsion F except that selective changes were made as shown in Table 5 in the kind and quantity of the monomers.

The thus prepared water-based emulsions F–N were subjected to evaluation tests which are the same as those of Example 1. The results of the tests are shown in Table 5.

TABLE 5

| | Water-based Emulsions | | | | | | | | |
|---|---|---|---|---|---|---|---|---|---|
| | F | G | H | I | J | K | L | M | N |
| Charged Monomers (g (mol %)) | | | | | | | | | |
| CTFE | 153(50) | 137(45) | 153(50) | 122(40) | 153(50) | 153(50) | 153(50) | 153(50) | 153(50) |
| VBu | 140(40) | — | 35(10) | 105(30) | 140(40) | 140(40) | 140(40) | 140(40) | 140(40) |
| v-9 | — | — | 107(22) | — | 24(5) | — | — | — | 24(5) |
| EVE | — | 32(17) | — | — | — | — | — | — | — |
| CHVE | — | 83(25) | — | 60(18) | — | — | — | — | — |
| AAA | 19(5) | 38(10) | 30(8) | — | 19(5) | 19(5) | 19(5) | 19(5) | — |
| HBAE/DK* | — | — | — | 28(5) | — | — | — | — | — |
| HBAE | — | — | — | 7(2) | — | — | — | — | — |
| UA | 24(5) | 15(3) | 48(10) | 24(5) | — | — | — | — | 24(5) |
| HA* | — | — | — | — | — | 17(5) | — | — | — |
| ODA* | — | — | — | — | — | — | 36(5) | — | — |
| HBVE/CA | — | — | — | — | — | — | — | 27(5) | — |
| Particle Diameter ($\mu$m) | 0.20 | 0.18 | 0.14 | 0.23 | 0.32 | 0.24 | 0.20 | 0.21 | 0.20 |
| Storage Stability | A | A | A | A | A | C | A | A | A |
| Mechanical Stability | A | A | A | A | C | C | C | A | A |

*HBAE/DK: polymerizable ally compound prepared by reacting hydroxylbutyl allyl ether with diketene; HA: 6-heptenoic acid; and ODA: 17-octadecylenic acid.

At a second step, a hardener aqueous solution containing 12 wt % of adipic acid dihydrazide made by Otsuka Chemical Co. was added to the water-based emulsion F, in an amount as shown in Table 6, thereby to obtain a one-package type water-based fluorine-containing paint.

name) of Otsuka Chemical Co., was dissolved in water, thereby to prepare a 12 wt % APA-L aqueous solution. This solution was used as a hardener aqueous solution.

TABLE 6

| | Ex. 5 | Ex. 6 | Ex. 7 | Ex. 8 | Ex. 9 | Ex. 10 | Com. Ex. 5 | Com. Ex. 6 | Com. Ex. 7 | Com. Ex. 8 |
|---|---|---|---|---|---|---|---|---|---|---|
| Fluorine-containing Copolymers (parts by weight) | | | | | | | | | | |
| F | 100 | 100 | — | — | — | — | — | — | — | — |
| G | — | — | 100 | — | — | — | — | — | — | — |
| H | — | — | — | 100 | — | — | — | — | — | — |
| I | — | — | — | — | 100 | 100 | — | — | — | — |
| J | — | — | — | — | — | — | 100 | — | — | — |
| L | — | — | — | — | — | — | — | 100 | — | — |
| M | — | — | — | — | — | — | — | — | 100 | — |
| N | — | — | — | — | — | — | — | — | — | 100 |
| Hardeners (parts by weight) | | | | | | | | | | |
| Adipic Acid Dihydrazide | 5 | — | 3 | — | — | 5 | 5 | 5 | — | 5 |
| APA-L | — | 7 | — | 5 | 5 | — | — | — | 5 | — |
| Coated Film Characteristics | | | | | | | | | | |
| Specular Gloss (%) | 80 | 76 | 81 | 80 | 81 | 79 | 81 | 82 | 83 | 85 |
| Rubbing Test | A | A | A | A | A | A | B | B | A | C |
| Water Resistance Test | A | A | A | A | A | A | A | C | A | C |
| Stain Resistance | A | A | A | A | A | A | C | B | B | C |
| Carbon Resistance Test | A | A | A | A | A | A | B | B | B | C |
| Weatherability (%) | 91 | 92 | 90 | 90 | 91 | 93 | 65 | 58 | 53 | 47 |

EXAMPLES 6–9

In each of these examples, Example 5 was repeated except that selective changes were made as shown in Table 6 in the kind and quantity of the water-based emulsion and of the hardener, to prepare the water-based fluorine-containing paint.

In Examples 6 and 8–9, as shown in Table 6, a polymer having hydrazino group at its side chain, APA-L (trade In Examples 6–9, as shown in Table 6, the fluorine-containing copolymers F–I and the water-based emulsions F–I were respectively used.

EXAMPLE 10

At first, a titanium oxide paste containing 72% of titanium oxide dispersed in water was added to the water-based emulsion I, in an amount of 25 parts by weight of the titanium oxide paste per 100 parts by weight of the fluorine-containing copolymer I. Then, 2 parts by weight of an aqueous solution containing 3% of hydroxyethyl cellulose (thickener), METHOLLOSE (trade name) of Shin-Etsu Chemical Co., was added to the mixture, thereby to obtain a white-color enamel, Then, 5 parts by weight of an adipic acid dihydrazide aqueous solution as that of Example 5, per 100 parts by weight of the fluorine-containing copolymer I, was added to the enamel, thereby to obtain a one-package type water-based fluorine-containing white paint.

COMPARATIVE EXAMPLES 5–8

In each of these comparative examples, Example 5 was repeated except that selective changes were made as shown in Table 6 in the kind and quantity of the water-based emulsion and of the hardener.

In Comparative Examples 5–8, as shown in Table 6, the fluorine-containing copolymers J, L, M and N and the water-based emulsions J, L, M and N were respectively used.

In Comparative Example 5, the polymerizable unsaturated carboxylic acid was omitted in the preparation of the fluorine-containing copolymer J (see Table 5). In Comparative Example 6, the polymerizable unsaturated carboxylic acid was replaced by 17-octadecylenic acid which is not according to the present invention (see Table 5). In Comparative Example 7, the polymerizable unsaturated carboxylic acid was replaced by a product (HBVE/CA) prepared by reacting hydroxybutyl vinyl ether with succinic anhydride (see Table 5), and there was used a hardener which is the same as that of Examples 6 and 8–9 (see Table 6). This product, HBVE/CA, is a polymerizable unsaturated carboxylic acid not according to the present invention. In Comparative Example 8, the polymerizable ally compound was omitted (see Table 5).

EVALUATION TESTS

In each of Examples 5–10 and comparative Examples 5–8, evaluation tests which are the same as those of Example 1 were conducted on the coated film, except that the evaluation standard for the stain resistance test was slightly modified as described hereinafter. The results are shown in Table 6.

The coated film was prepared in the same manner as in Evaluation Tests in Example 1. With this, the obtained coated film had a thickness of about 30 μm, a flat surface, and a high transparency in each of Examples 5–9; it had a thickness of 47 μm in Example 10; and it had a thickness of about 35 μm, a flat surface, and a high transparency in each of Comparative Examples 5–8.

In the stain resistance test, after the exposure, the existence of rain streaks on the lower portion, and the stains on the upper portion were examined with the naked eye. As to the results, "A" means that no rain-streak was on the lower portion, and the upper portion was hardly stained; "B" means that rain streaks were on the lower portion but unobtrusive, and the upper portion was stained; and "C" means that rain streaks were on the lower portion and obtrusive, and the upper portion was greatly stained.

What is claimed is:

1. A water-based fluorine-containing paint comprising:
   a water-based emulsion containing water as a dispersion medium and a fluorine-containing copolymer as a disperse phase, said fluorine-containing copolymer being prepared by copolymerizing 30–65 mol % of a fluoroolefin, 14–69 mol % of a copolymerizable vinyl-containing compound, and 1–30 mol % of a first compound which is at least one of a hydroxyl-containing compound and a polymerizable carboxyl-containing compound; and
   1–50 parts by weight of a hardener per 100 parts by weight of said fluorine-containing copolymer, said hardener being prepared by mixing a self-emulsifiable polyisocyanate with 0.01–1 part by weight, per part by weight of said polyisocyanate, of a second compound containing in the molecule an oxyethylene unit and an alkoxysilyl group.

2. A paint according to claim 1, wherein said fluoroolefin is one selected from the group consisting of chlorotrifluoroethylene, tetrafluoroethylene, hexafluoropropene, hexafluoroisobutene, vinylidene fluoride, trifluoroethylene, and vinyl fluoride.

3. A paint according to claim 2, wherein said fluoroolefin is said chlorotrifluoroethylene, said vinyl-containing compound is a vinyl ester, and said first compound is a hydroxyl-containing allyl compound, and wherein said fluorine-containing copolymer is prepared by copolymerizing these monomers.

4. A paint according to claim 1, wherein said carboxyl-containing compound is 10-undecylenic acid, and wherein said fluorine-containing copolymer is prepared by using said 10-undecylenic acid as a monomer.

5. A paint according to claim 1, wherein said vinyl-containing compound is one selected from the group consisting of vinyl esters, vinyl ethers and allyl ethers.

6. A paint-according to claim 1, wherein said hydroxyl-containing compound is one selected from the group consisting of hydroxyl-containing allylethers, vinyl ethers, and crotonic acid modified compounds.

7. A paint according to claim 1, wherein said carboxyl-containing compound has a polymerizable double bond.

8. A paint according to claim 7, wherein said carboxyl-containing compound is one selected from the group consisting of vinylacetic acid, decenoic acid, 10-undecylenic acid, and crotonic acid.

9. A paint according to claim 1, wherein said fluorine-containing copolymer is prepared by emulsion polymerization.

10. A paint according to claim 9, wherein an emulsifying agent is used in said emulsion polymerization, is one of anion and nonion emulsifying agents, and is in an amount from 0.5 to 10 parts by weight per 100 parts by weight of a total of all of monomers used in said emulsion polymerization.

11. A paint according to claim 9, wherein a radical polymerization initiator is used in said emulsion polymerization and is in an amount from 0.05 to 5 parts by weight per 100 parts by weight of a total of all of monomers used in said emulsion polymerization.

12. A paint according to claim 9, wherein water is used in said emulsion polymerization and is in an amount from 50 to 400 parts by weight per 100 parts by weight of a total of all of monomers used in said emulsion polymerization.

13. A paint according to claim 1, wherein a solid matter concentration of said water-based emulsion is from 10 to 70 wt %.

14. A paint according to claim 1, wherein said self-emulsifiable polyisocyanate has a hydrophilic group.

15. A paint according to claim 1, wherein said second compound has an oxyethylene repeating unit number from 1 to 20.

* * * * *